Nov. 21, 1972 STANLEY Y. YOSHINO 3,703,422
POLYAROMATIC RESIN FACED HONEYCOMB PANEL
AND METHOD FOR MAKING SAME
Filed Jan. 2, 1970
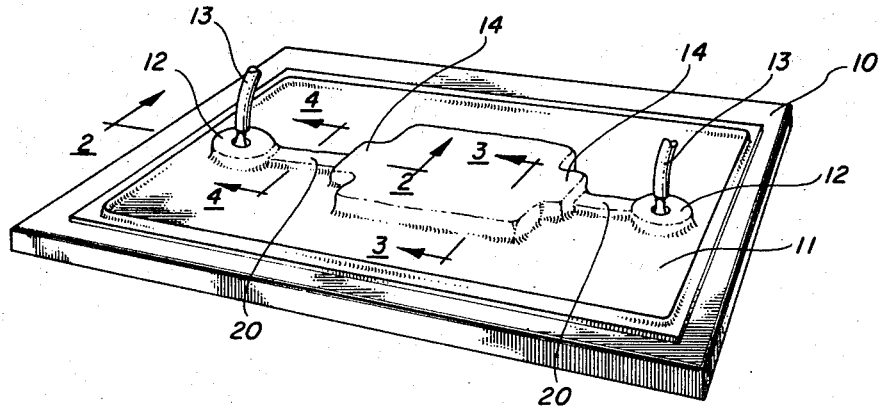
FIG. 1
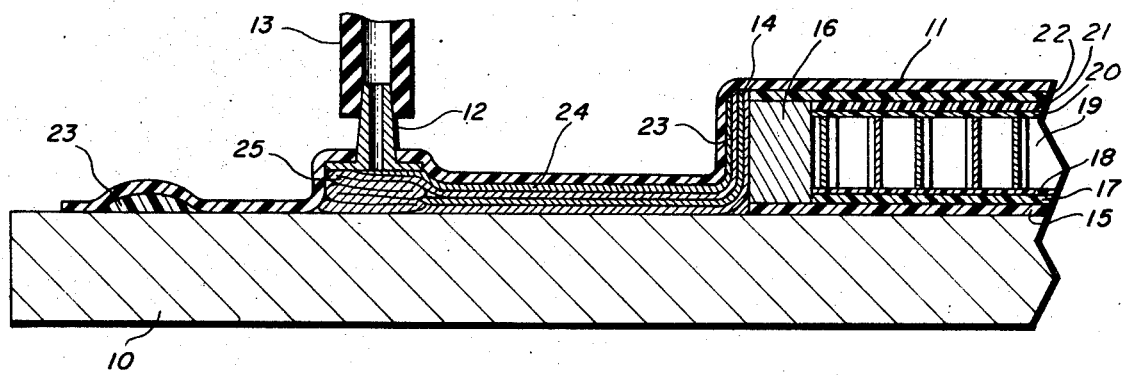
FIG. 2
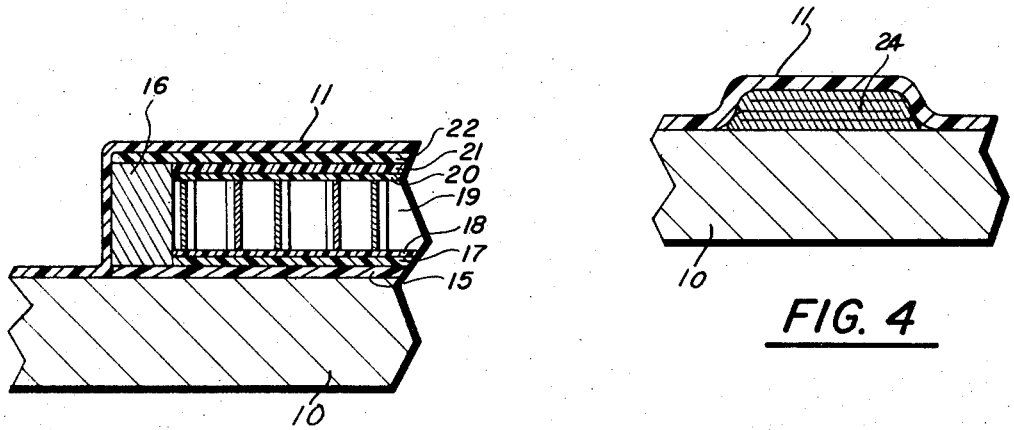
FIG. 3
FIG. 4
INVENTOR.
STANLEY Y. YOSHINO
ATTORNEY

United States Patent Office 3,703,422
Patented Nov. 21, 1972

3,703,422
POLYAROMATIC RESIN FACED HONEYCOMB PANEL AND METHOD FOR MAKING SAME
Stanley Y. Yoshino, Monterey Park, Calif., assignor to North American Rockwell Corporation
Filed Jan. 2, 1970, Ser. No. 334
Int. Cl. B32b 31/02, 31/26
U.S. Cl. 156—87      10 Claims

ABSTRACT OF THE DISCLOSURE

A honeycomb panel with non-flammable face sheets made of glass cloth impregnated with a polyaromatic resin such as polyimide is disclosed. A vacuum bag layup arrangement having stacked in order on a platen a Teflon cloth, a face sheet, a bonding agent made of a thin film of epoxy type resin, a honeycomb core, another film of bonding agent, another face sheet, and another Teflon cloth. A bleeder fabric made of glass cloth is provided to make contact with the Teflon cloth and the evacuation connection for the vacuum bag. The bag has its edges sealed to the platen and then evacuated. While a vacuum is maintained within the bag the epoxy is heat-cured and then the polyimide is heat-cured.

---

This invention relates to a non-flammable honeycomb panel and a method of making same.

Honeycomb panels, being strong relative to their weight, have found great use in areas where weight is a factor, such as in aircrafts. Up to now, non-flammable honeycomb panels were made with sheet metal faces, since known plastic face sheets, although lighter than metal, have not the desired degree of non-flammability as the metallic. However, I have disclosed in my U.S. patent application No. 805,595, filed on Mar. 10, 1969, a method for making and curing a glass cloth face sheet impregnated with polyimide, which face sheet has a very high degree of non-flammability. Although these face sheets can be glued to a honeycomb core after curing, up to now there was no known process to bond uncured polyimide sheets to a honeycomb core and curing the bonding agent and polyimide together.

Therefore, an object of this invention is to provide a non-flammable plastic honeycomb panel that is simple and economical to make.

Another object is to provide a honeyocmb core bonded to non-flammable polyaromatic resins with an epoxy type bonding agent.

Another object is to provide a method of bonding face sheets of polyaromatic resins to a honeycomb core using epoxy resin and curing both resins together.

These and other objects and features of advantage of this invention will become better understood by reference to the following detailed description when considered together with the drawing, in which:

FIG. 1 illustrates in perspective a typical panel contained within a vacuum bag;
FIG. 2 is a section of a portion of the vacuum bag taken on line 2—2 of FIG. 1;
FIG. 3 is a section taken on line 3—3 of FIG. 1; and
FIG. 4 is a section taken on line 4—4 of FIG. 1.

In this application the invention will be described in particular in conjunction with polyimide resin. However, other polyaromatic resins such as polybenzimidizole, polysulfone and polyphenylene can be used in place of polyimide. Typical polyimide resins such as PI 3301 available from E. I. du Pont de Nemours and Skybond 700 available from Monsanto, are inherently useful at elevated temperatures.

FIG. 1 illustrates a vacuum bag layup incorporating the principles of this invention. There is provided a platen or mold 10 which, for purposes of illustration, is a flat plate. Other more complex geometries of mold can readily be employed as is conventional, and the illustration of flat plate mold in FIG. 1 is only for purposes of exposition. The panel being formed is covered by an impervious sheet, usually known as a vacuum bag 11 with vacuum connections 12 that are provided with hoses 13 running to a vacuum pump (not shown). In FIG. 1 the general outline of a structural panel beneath the vacuum bag 11 can be seen. On opposite sides of the panel are formed tabs 14 whose function will hereinafter be described.

Referring to FIGS. 2 and 3 there is shown a portion of the honeycomb panel in cross-section. To make the panel, a layer 15, that does not stick to and is permeable to both gases and liquid polyimide resin, is laid on the mold 10. Suitable porous release layers include perforated sheets of woven cloth made of polyethylene terephthalate or polytetrafluoroethylene (available under the trademarks Mylar and Teflon, respectively, from E. I. du Pont de Nemours and Company, Wilmington, Del.), glass cloth coated with Teflon, aluminum screening coated with Teflon, etc. Over the layer 15 is placed a frame 16 made of, for example, metal coated with a suitable releasing agent. The opening in the frame 16 is the size of the panel and its height is the thickness of the finished panel. Next, the parts of the panel are stacked one over the other within the frame 16. One or more layers of the polyimide prepregs are laid within the frame 16 onto the layer 15 to form a polyimide face sheet 17. A layer of polyimide prepreg comprises a sheet of glass cloth impregnated with a polyimide resin. The percentage of resin in a layer of prepreg is normally 40 to 50 percent which comprises about 30 to 40 percent by weight of curable polyimide and about 10 to 20 percent of volatile materials. Thus one function of the layer 15 is to provide a path for removal of these volatiles during curing. The number of layers of prepregs to form sheet 17 is determined by the size and strength that the finished panel should have. Over sheet 17 is placed a film 18 of epoxy type resin. This adhesive is a thermosetting resin and comes as preferably a film which can be laid in place and known by the trademark "Reliabond 391" manufactured by the Reliable Manufacturing Company of Costa Mesa, Calif. Over the film 18 is placed a honeycomb core 19 made of, for example, aluminum foil. Honeycomb cores are well known in the art. Over the core 19 is placed another epoxy type resin film 20 which is similar to film 18 and then one or more layers of polyimide resin prepregs to form the other face sheet 21. Over the frame 16 and face sheet 21 is placed another layer 22 similar to release layer 15.

The tabs 14 are formed of multilayers 23 of glass cloth (FIG. 2). The layers 23 contact layers 15 and 22 so that gas flow is permitted from the layers 15 into the tabs 14. From tabs 14 to the vacuum connection 12 are disposed about four layers 24 of glass cloth with a wad 25 of folded glass cloth under the connection 12. Now the vacuum bag 11 is placed over the assembly as shown and the edges thereof sealed with zinc chromate putty 23. The vacuum bag 11 is made from any film type material which is impervious, and strong and withstands the curing temperatures. Thus when a vacuum is drawn through tubes 13 the vacuum bag 11 assumes the shape as shown in FIG. 1. The assembly is now ready for curing.

While vacuum is being drawn through tubes 13 the assembly is treated by means (not shown) to 250° F. and held there at that temperature for one hour. The vacuum within the bag 11 is being held at a minimum of 27 inches of mercury. This procedure cures the epoxy resin providing some structural strength. Then the temperature of the assembly is raised to 350° F. or higher to fully cure the polyimide. Since polyimide first becomes very soft and has a very low viscosity during curing care should be taken to limit the initial curing temperature to no more than 350° F. and the assembly should be held at this relatively low temperature for at least one hour to allow the epoxy to cure and to provide some structural support. Otherwise, the atmospheric pressure on the bag 11 will squeeze more polyimide into the core 19 than would be desirable.

Obviously many variations and modifications can be made in the practice of this invention. For example, the exact processing parameters may differ for other polyaromatic resins and other bonding agents. The scope of the invention is to be only limited by the claims.

What is claimed is:

1. A process for making a honeycomb panel, said process comprising the steps of:
    forming a resin release layer on a mold;
    placing a frame on said mold;
    placing an uncured prepreg layer within said frame, said prepreg including a glass cloth impregnated with polyaromatic resin;
    placing an uncured bonding agent resin on said prepreg, said bonding agent resin curing at a lower temperature than said polyaromatic resin;
    placing a honeycomb core within said frame;
    placing another uncured bonding agent resin and another uncured prepreg layer on said honeycomb;
    forming a bleeder layer over said other prepreg layer to form a stack on said mold;
    evacuating the stack formed on said mold so that all volatiles are removed therefrom and atmospheric pressure forces the stack together; and
    heating the stack to a temperature to cure said bonding agent resin.

2. The process of claim 1 wherein said step of forming said release layer on said mold is formed by placing bleeder and reelase layer on said mold which is pervious to volatiles.

3. The process of claim 1 wherein
    said polyaromatic resin is polyimide,
    said bonding agent resin is an epoxy type resin,
    said bleeder layer is a Teflon type cloth, and
    said heating step includes heating said stack to no more than 350°.

4. The process of claim 3 wherein said stack is further cured until said polyimide resin is cured.

5. The process of claim 2 wherein:
    said polyaromatic resin is polyimide;
    said binding agent resin is an epoxy type resin;
    said bleeder layer is a Teflon type cloth; and
    said heating step includes heating said stack to no more than 350° F.

6. The process of claim 5 wherein:
    said stack is further cured until said polyimide resin is cured.

7. A process for making a honeycomb panel, said process comprising the steps of:
    forming a stack of an uncured prepreg layer, an uncured bonding agent layer, a honeycomb, another uncured bonding agent layer, another prepreg layer and a bleeder layer on a mold, said prepreg layer including a glass cloth impregnated with polyaromatic resin;
    said bonding agent resin curing at a lower temperature than said prepreg layer;
    evacuating the stack so that all volatiles are removed therefrom through said bleeder layer and atmospheric pressure forces the stack together; and
    heating the stack to a temperature to cure first said bonding agent resin.

8. The process of claim 7 wherein said polyaromatic resin is polyimide,
    said bonding agent resin is an epoxy type resin said heating step includes heating said stack to no more than 350° until said epoxy is cured.

9. The process of claim 8 wherein said stack is further cured to a higher temperature until said polyimide is cured.

10. The process of claim 8 wherein the top prepreg layer is cured polyimide when placed on said stack.

References Cited

UNITED STATES PATENTS

| | | | |
|---|---|---|---|
| 2,998,342 | 8/1961 | Waugh et al. | 156—197 UX |
| 3,383,265 | 5/1968 | Garabedian | 156—285 X |
| 3,067,507 | 12/1962 | Titus | 156—286 X |
| 2,700,632 | 1/1955 | Ackerlind | 156—285 X |
| 3,106,503 | 10/1963 | Randall et al. | 156—197 |

CARL D. QUARFORTH, Primary Examiner

S. R. HELLMAN, Assistant Examiner

U.S. Cl. X.R.

156—285, 286, 289, 330, 331